March 9, 1965

W. D. HOFFMAN 3,173,118

MECHANICAL COUPLING

Filed April 10, 1961

INVENTOR.
William D. Hoffmann
BY
Andrus & Starke
Attorneys

United States Patent Office 3,173,118
Patented Mar. 9, 1965

3,173,118
MECHANICAL COUPLING
William D. Hoffmann, Elkhorn, Wis., assignor to A. O. Smith Corporation, Milwaukee, Wis., a corporation of New York
Filed Apr. 10, 1961, Ser. No. 101,707
4 Claims. (Cl. 336—129)

This invention relates to a mechanical coupling and particularly to a mechanical coupling permitting two-way movement on the input and the output side when the operating force is transmitted from the input side while restricting movement when the operating force is applied to the output side of the coupling.

The coupling of this invention is particularly adapted for coupling of a current input control to an arc welding transformer of the movable core or coil variety.

In a transformer of the movable coil design, one of the windings, normally the secondary, is fixedly mounted upon a core structure. The primary is movably mounted upon a leg of the core structure for selective spacing with respect to the secondary to vary the magnetic coupling therebetween and thereby vary the current output. The primary may, for example, be connected through a conventional gear and lead screw to a manually or automatically operated rotating input to adjustably position the primary with respect to the secondary.

In loaded transformers, the electro-magnetic effect between the primary and the secondary windings establishes a force tending to separate the windings. The secondary is fixedly mounted and cannot move and consequently the entire force is applied to the primary, which tends to move away from the secondary.

The torque on the screw must be overcome to hold the primary winding stationary by some suitable means in order to maintain optimum welding output. Generally, friction brakes and the like have been employed to hold the primary against movement. However, friction brakes require very close tolerance to allow simple and easy input movement. Further, the operation and effectiveness of friction brakes vary with atmospheric conditions and the like.

The present invention is directed to providing a rugged and reliable coupling requiring relatively low-energy force on the input side to rotate the output means in either direction and having a positive acting brake applied on the output side when a force is applied directly to the output means as by the electro-magnetic forces which are applied to the lead screw in the transformer action previously described.

In accordance with the present invention, the coupling includes a direct connection between an input and an output shaft. A brake or latch member is provided which is continuously biased into holding engagement to prevent movement of the shafts in at least one direction. A release means is coupled to the input side of the coupling and is adapted to engage and release the brake or latch member is effective to prevent movement when side of the coupling. On the output side, however, there is no release interconnection and consequently the brake or latch member is effective to prevent movement when the force is applied to the output side of the coupling. As applied to a welding transformer, the brake or latch member prevents the rotation of the lead screw normally established by the electromagnetic forces applied to the primary winding.

The drawing furnished herewith illustrates the best mode presently contemplated for carrying out the invention.

Figure 1:
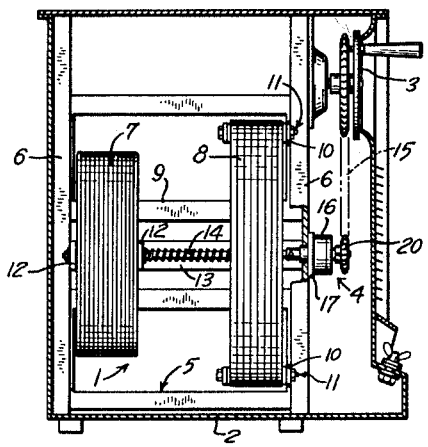
FIG. 1 is a side elevational view of an arc welding transformer of the movable coil design including an input coupling constructed in accordance with the present invention.
Figure 2:
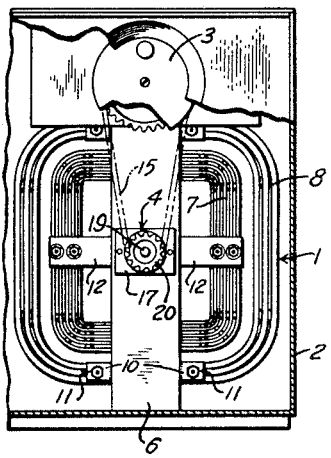
FIG. 2 is a front elevational view of FIG. 1 with parts broken away.

Referring to the drawing and particularly to FIGS. 1 and 2, an arc welding transformer 1 is diagrammatically shown mounted within a suitable housing 2. A current control hand wheel 3 is mounted adjacent the front wall of the housing 2 and connected through a mechanical brake and coupling 4 to control the current setting of the arc welding transformer 1.

The illustrated transformer 1 includes a three-legged magnetic core structure 5 having the legs stacked in vertically spaced relation and joined by magnetic end core portions. Upright mounting frames 6 are secured within the housing and to the end core portions of magnetic core 5 to rigidly support the core within the housing 2. A primary winding 7 and a secondary winding 8 are concentrically wound upon the central leg 9 of the core 5 within the housing 2. Mounting brackets 10 are formed on the forwardmost upright frame 6 and are secured to the secondary winding 8 to fixedly secure the secondary winding immediately adjacent the forward wall of the housing 2 as by nut and bolt units 11.

The outer diameter of the primary winding 7 is generally slightly smaller than the internal diameter of the secondary winding 8, as shown most clearly in FIG. 2. The primary winding 7 is thus adapted to be moved into the secondary winding 8 adjacent the front of housing 2 for maximum magnetic coupling therebetween and to be moved rearwardly on the central core leg 9 in spaced relation to the secondary winding 8 to decrease the magnetic coupling and thereby reduce the output relationship.

A pair of oppositely disposed bearing members 12 are fixedly secured to the central side portions on the front and back of the primary winding 7 generally in vertical alignment with the central leg 9. Bearing members 12 extend into suitable slideways 13 provided on the central leg 9 of the core 5 and slidably support the primary winding 7 for movement with respect to the secondary winding 8.

A lead screw 14 is journaled in the upright mounting frames 6 and passes through a suitable opening in the central leg 9 of the core 5. A lead nut, not shown, is threaded ontto the lead screw 14 and connected in any suitable manner to the bearing members 12. Consequently, rotation of the lead screw 14 results in threading of the nut, not shown, longitudinally of the lead screw with corresponding positioning of the primary winding 7.

The coupling 4 is secured to the forward end of the lead screw 14 and is connected to the hand wheel 3 by a chain and sprocket drive 15 to allow manual rotation of the lead screw and corresponding positioning of the primary winding 7.

Figure 3:
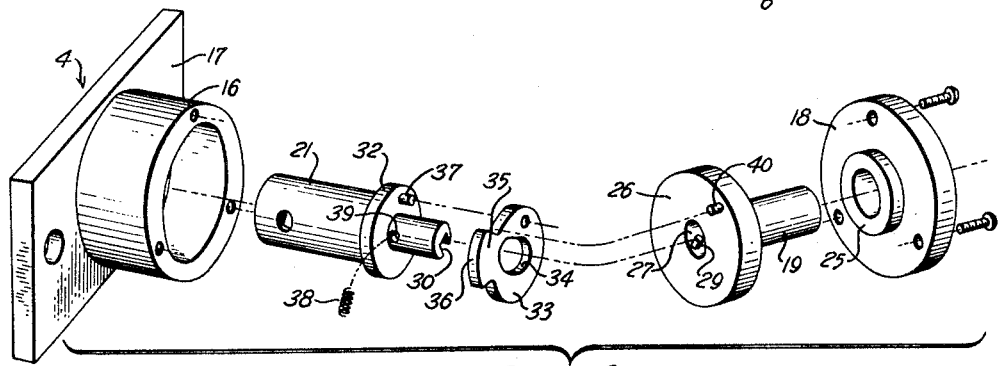
FIG. 3 is an exploded view of the coupling shown in FIGS. 1 and 2.
Figure 4:
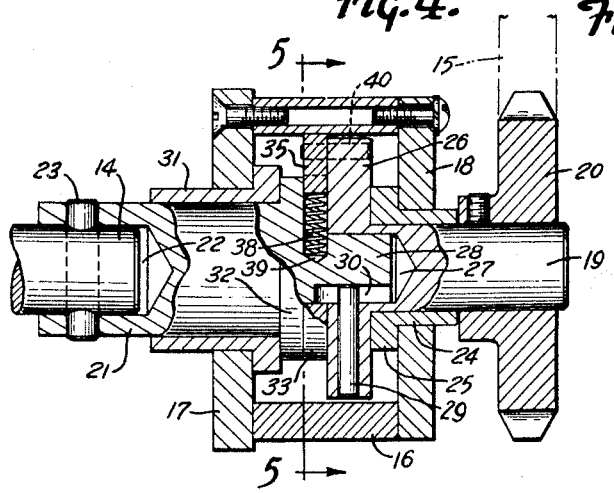
FIG. 4 is a vertical enlarged section through the coupling.
Figure 5:
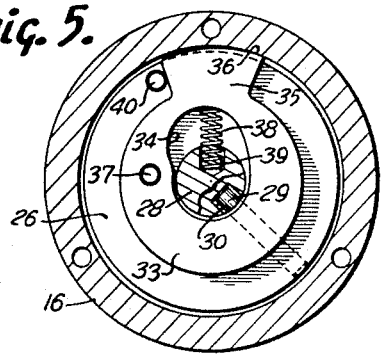
FIG. 5 is a vertical section taken on lines 5—5 of FIG. 4.

Referring particularly to FIGS. 3–5, the mechanical brake and coupling 4 includes a cylindrical housing 16 having a mounting frame 17 at one axial end secured to the forward wall of the front upright mounting frame 6. The opposite end of housing 16 is closed by an end wall 18. An input shaft 19 projects from the end wall 18 opposite mounting frame 17 and carries a sprocket 20 of the chain and sprocket drive 15.

An output shaft 21 projects outwardly from the opposite end of the housing 16 adjacent mounting flange 17 in axial alignment with the input shaft 19. The projected end of the output shaft 21 is recessed as at 22 to accommodate the adjacent end of the lead screw 14. A pin 23 is press fitted through aligned openings in the output shaft 21 and the mating end of the lead screw 14 to rigidly interconnect the lead screw to the output shaft. Therefore, rotation of the hand wheel 3 is transmitted through the coupling 4 from the input shaft 19 to the output shaft 21 and thus to the lead screw 14 for selective adjustment of the primary winding 7 with respect to the secondary winding 8.

A flanged radial bearing 24 is mounted within the input shaft opening in the housing 16 and includes a flange 25 engaging the adjacent inner surface of the front wall 18 of housing 16. The bearing 24 radially supports the input shaft 19 and, as subsequently described, also absorbs outward thrust forces applied to the shaft. A brake release disc 26 is integrally formed with the input shaft 19 immediately adjacent the flange 25 and bears on the flange to transmit thrust forces to the flange of the bearing 24 and thus to the housing 16, which is rigidly secured to the mounting frame 6.

The inner end of the shaft 19 includes an axial recess 27 accommodating a coupling projection 28 on the aligned inner end of the output shaft 21. A radial pin 29 is secured within the wall of the recess 27 and projects radially into a suitable keyway 30 provided in the coupling projection 28 of the output shaft 21. Consequently, rotation of the input shaft 19 is transmitted through the pin 29 and keyway 30 to the output shaft 21 to establish corresponding movement of the output shaft.

As most clearly shown in FIG. 5, the illustrated keyway 30 includes a circumferential dimension somewhat greater than the thickness of the drive pin 29 to provide a limited lost motion interconnection of the input shaft 19 to the output shaft 21 for reasons more fully described hereinafter.

A flanged bearing 31 is mounted within the opening for the output shaft 21 and is constructed generally similar to the bearing 24 for the input shaft 19. A cam flange 32 is integrally secured on the shaft 21 and bears on the adjacent portion of the bearing 31 to transmit axial thrust forces on the output shaft 21 to the bearing and thus to the housing 16.

A brake cam 33 is pivotally clamped between the brake release disc 26 and the cam flange 32. The cam 33 includes a central slot 34 accommodating shaft projection 28 and being somewhat larger than the projection 28. The cam 33 is generally a cylindrical disc having a brake arm 35 projecting radially outwardly with a circumferential brake surface 36 adapted to engage the adjacent wall of the housing 16. A pivot pin 37 is secured within the cam flange 32 and projects axially into a suitable pivot opening provided in the cam 33 and thereby defines a pivot support for cam 33 on shaft 21. A coil spring 38 is disposed with one end within an opening 39 in the coupling shaft projection 28 of shaft 21 and projecting radially into engagement with the wall of slot 34 of the cam 33. The recess 39 is perpendicularly related to the location of the pivot pin 37 and the coil spring 38 therefore continuously biases the cam 33 about the pivot pin 37 to dispose the brake surface 36 in engagement with the adjacent wall of the housing 16.

The brake surface 36 of arm 35 is generally a spiral with respect to the center of the input and output shafts 19 and 21. Consequently, when the output shaft 21, and therefore the shaft projection 28 and the attached cam 33, are rotated in a counterclockwise direction as viewed in FIG. 5, the force on the brake arm 35 pivots the cam 33 away from the housing wall and allows free rotation of the output shaft 21. However, when the output shaft 21, and the attached shaft projection 28 and cam 33 are rotated in the opposite or clockwise direction, as viewed in FIG. 5, the force on the brake arm 35 pivots the cam 33 in a direction to frictionally grip the adjacent wall of the housing 16 and prevents movement of the cam 33 with respect to the wall. Consequently, the output shaft 21 is locked against such movement.

The brake disc 26 engages the opposite face of the cam 33 and the brake arm 35. A pin 40 which constitutes a release means for cam 33 projects axially from the outer surface of the disc 26 and is circumferentially located to project into engagement with the trailing side of the arm 35 with the cam 33 moving in the braking direction. The pin 40 is located on the disc 26 to be correctly positioned with respect to the arm 35 when pin 29 meshes with the keyway 30 of the shaft projection 28.

When the input shaft 19 is turned in a direction to rotate the output shaft 21 and the attached cam 33 in a non-braking direction, the rotation is freely transmitted through the coupling 4.

When the input shaft 19 is turned in an opposite direction which carries the output shaft 21 and the attached cam 33 in the braking direction, the pin 40 engages the arm 35 and positively pivots the cam about the pivot pin 37 to hold the braking surface 36 in spaced and thus non-braking relation to the adjacent wall of the housing 16. The lost motion provided by the loose fit between the pin 29 and the keyway 30 allows a slight forward movement of the input shaft 19 to positively release the braking arm 35 before the output shaft 21 moves the cam 33 and the integral brake arm 35 into braking engagement with the wall of housing 16.

The coupling 4 permits rotation of the output shaft 21 in either direction when the rotational force is applied to the input shaft 19. However, when the force is applied directly to the output shaft 21, the braking action of the cam 33 permits movement in only one direction.

In the illustrated embodiment of the invention, a force applied to the output shaft 21 permits rotation in only the direction which moves the primary winding 7 toward the secondary winding 8. Reverse movement is positively prevented through the above-described braking action. Consequently, the electromagnetic forces established during the operation of the transformer 1 and which continuously urge the primary winding 7 away from the secondary winding 8 are absorbed in the braking system and the primary winding 7 is held in the desired preset position.

Therefore, the operator may readily position the primary winding 7 to any selected position by turning of the hand wheel 3 with assurance that the setting will be held.

The present invention thus provides a relatively simple and rugged coupling permitting a two-way input and a two-way output, while preventing similar movement of the output shaft when the force is directly applied on the output side of the coupling.

Various modes of carrying out the invention are contemplated as being within the scope of the following claims particularly pointing out and distinctly claiming the subject matter which is regarded as the invention.

I claim:

1. In a coupling having an input shaft and an output shaft rotatably journaled in axial alignment in opposite end walls of a coupling housing, a pin and groove coupling connecting the inner adjacent ends of the shafts and including a limited lost motion, an encircling integral flange on each of said shafts axially spaced from each other, a cam disposed between said flanges and having a peripheral braking surface adapted to frictionally engage the adjacent wall of the housing to prevent rotation in one direction while permitting rotation in the opposite direction, a pivot support securing said cam to said output shaft, biasing means coupled to the cam and urging the braking surface into frictional braking engagement with the housing, and a release member secured to the flange of the input shaft and engaging said cam to overcome the biasing means and hold the braking surface from the housing and allowing movement of the input shaft in the corresponding direction.

2. A coupling having an input shaft and an output shaft, a tubular housing having end walls with said shafts coaxially journaled in opposite end walls, one of said shafts having a recess to accommodate the adjacent end of the opposite shaft within said recess, one of said shafts including a radially projected pin and the opposite shaft including a keyway to couple said shafts, said keyway being circumferentially larger than said pin to permit limited independent rotation of said shafts, a cam having an enlarged central slot disposed on said shafts, a pivotal support pivotally securing the cam to said output shaft, a coil spring disposed within said slot and acting between the adjacent shaft and the periphery of the slot to pivot the cam into engagement with the wall of the housing, said cam having a braking surface preventing rotation of the output shaft in one direction and permitting rotation in the opposite direction of the output shaft, and a release pin secured to the input shaft and engaging the cam to release the cam from the braking position upon the initial independent movement of the input shaft in the direction of rotation prevented by the braking surface.

3. The construction of claim 2 wherein said cam includes a radial braking arm terminating in a curved braking surface generally normal to the radial line to the pivot support, said coil spring within the central slot of the cam acting in theradial direction of said braking arm, the input shaft and the output shaft each including radial flanges on opposite sides of said cam and having the cam pivot support secured to the flange of the output shaft and the release pin secured to the flange of the input shaft, and the release pin being radially located on the input shaft with respect to said braking arm to engage the side of the arm and to effect a brake release upon initial movement of the input shaft and release pin.

4. In an arc welding transformer having a movable transformer coil and a fixed transformer coil mounted for adjustable magnetic coupling and having a rotatable control for movement of the movable transformer coil, a coupling interposed between said control and said movable coil and having an input shaft connected to said control and an output shaft connected to said movable coil, a tubular housing having end walls with said shafts coaxially journaled in opposite end walls, one of said shafts having a recess to accommodate the adjacent end of the opposite shaft within said recess, one of said shafts including a radially projected pin and the opposite shaft including a keyway to couple said shafts, said keyway being circumferentially larger than said pin to permit limited independent rotation of said shafts, a cam having an enlarged central opening disposed on said shafts and pivotally secured to said output shaft, a coil spring disposed within said opening and acting between the adjacent shaft and the periphery of the opening to pivot the cam into engagement with the wall of the housing, said cam having a braking surface preventing rotation in the direction of the output shaft rotation established by electromagnetic forces between said coils and permitting rotation in the opposite direction of the output shaft, and a pin secured to the input shaft and engaging the cam to release the cam from the braking position upon the initial independent movement of the input shaft.

References Cited in the file of this patent
UNITED STATES PATENTS

| | | |
|---|---|---|
| 1,528,686 | Neumann | Mar. 3, 1925 |
| 1,867,409 | Juergens | July 12, 1932 |
| 2,681,438 | Anderson | June 15, 1954 |
| 2,873,832 | Helm | Feb. 17, 1959 |
| 2,995,226 | Gilder | Aug. 8, 1961 |

UNITED STATES PATENT OFFICE
CERTIFICATE OF CORRECTION

Patent No. 3,173,118 March 9, 1965

William D. Hoffmann

It is hereby certified that error appears in the above numbered patent requiring correction and that the said Letters Patent should read as corrected below.

Column 1, line 58, strike out "is effective to prevent movement when" and insert instead -- while the force is applied on the input --.

Signed and sealed this 21st day of December 1965.

(SEAL)
Attest:

ERNEST W. SWIDER
Attesting Officer

EDWARD J. BRENNER
Commissioner of Patents